United States Patent
Olilla et al.

(10) Patent No.: US 10,717,385 B2
(45) Date of Patent: Jul. 21, 2020

(54) DECORATIVE RING POINTER CAP ILLUMINATION

(71) Applicant: Continental Automotive Systems, Inc., Auburn Hills, MI (US)

(72) Inventors: Curt Olilla, Fenton, MI (US); Vyacheslav Birman, Auburn Hills, MI (US)

(73) Assignee: Continental Automotive Systems, Inc., Auburn Hills ( * ) Notice: Subject to any disclaimer, the term of this patent is extended or adjusted under 35 U.S.C. 154(b) by 178 days.

(21) Appl. No.: 16/113,236

(22) Filed: Aug. 27, 2018

(65) Prior Publication Data

US 2018/0361921 A1 Dec. 20, 2018

Related U.S. Application Data

(63) Continuation of application No. PCT/US2017/019558, filed on Feb. 26, 2017.

(60) Provisional application No. 62/300,251, filed on Feb. 26, 2016.

(51) Int. Cl.
| | |
|---|---|
| *B62D 25/14* | (2006.01) |
| *B60Q 3/12* | (2017.01) |
| *B60K 35/00* | (2006.01) |
| *B60K 37/02* | (2006.01) |

(52) U.S. Cl.
CPC ............... *B60Q 3/12* (2017.02); *B60K 35/00* (2013.01); *B60K 37/02* (2013.01); *B60K 2370/33* (2019.05); *B60K 2370/331* (2019.05)

(58) Field of Classification Search
CPC ..... G01D 11/28; G06F 3/0482; G06F 3/0481; G06F 3/04812; B60K 2370/154; A61B 34/2057; A61B 34/20; A61B 2034/2055; A61B 2090/3983; A61B 90/36
See application file for complete search history.

(56) References Cited

U.S. PATENT DOCUMENTS

| | | | |
|---|---|---|---|
| 6,302,552 B1 * | 10/2001 | Ross | G02B 6/001 116/288 |
| 6,338,561 B1 | 1/2002 | Ikarashi | |
| 7,520,242 B2 * | 4/2009 | Vuilliomenet | G01D 11/24 116/284 |

(Continued)

FOREIGN PATENT DOCUMENTS

CN 201921773 Y 8/2009

OTHER PUBLICATIONS

International Search Report and Written Opinion dated May 22, 2017 from corresponding International Patent Application No. PCT/US2017/019558.

*Primary Examiner* — Kiran B Patel

(57) ABSTRACT

A pointer assembly for a vehicle instrument panel includes a pointer arm, a cap, and a shroud. The pointer arm includes a platform portion disposed about an axis or rotation and an arm portion extending outward from the platform portion. The platform portion includes an illuminable perimeter. The cap is secured to the platform portion of the pointer arm inside of the illuminable perimeter. The shroud is secured to the platform portion of the pointer arm outside of the illuminable perimeter, and the illuminable perimeter is visible between an outer perimeter of the cap and an inner perimeter of the shroud.

6 Claims, 6 Drawing Sheets

(56) References Cited

U.S. PATENT DOCUMENTS

| | | | |
|---|---|---|---|
| 2003/0079672 A1* | 5/2003 | Kalashnikov | G01D 11/28 116/288 |
| 2006/0050501 A1* | 3/2006 | Dyer | G01D 11/28 362/23.18 |
| 2007/0035960 A1* | 2/2007 | Birman | G01D 11/28 362/489 |
| 2008/0264328 A1* | 10/2008 | Birman | G01D 11/28 116/288 |
| 2014/0063778 A1* | 3/2014 | Baker | G01D 13/22 362/23.2 |
| 2014/0165903 A1* | 6/2014 | Birman | B60K 37/02 116/28 R |
| 2014/0165904 A1* | 6/2014 | Birman | G01D 13/265 116/28 R |
| 2015/0035517 A1* | 2/2015 | Blackmer | G01D 5/145 324/207.2 |
| 2015/0042462 A1* | 2/2015 | Blackmer | B60K 37/02 340/438 |
| 2015/0138751 A1* | 5/2015 | Sherman | G01D 13/265 362/23.21 |
| 2015/0151668 A1* | 6/2015 | Birman | B60Q 1/0017 362/23.21 |
| 2016/0093405 A1* | 3/2016 | Birman | G12B 11/04 116/288 |
| 2016/0116311 A1* | 4/2016 | Birman | G01D 13/265 116/288 |
| 2018/0364078 A1* | 12/2018 | Ollila | G01D 13/265 |
| 2019/0084422 A1* | 3/2019 | Iwao | B60Q 3/14 |

\* cited by examiner

SECTION B-B

SECTION A-A

DECORATIVE RING POINTER CAP ILLUMINATION

FIELD

The present disclosure relates to vehicle instrument panels and clusters, and more specifically to a pointer assembly that provides illumination of the pointer and a perimeter ring about an axis of rotation.

BACKGROUND

Vehicles include instrument panels to communicate information indicative of operation to an operator. Motor vehicles include instrument panels with several gauges and dials that communicate vehicle conditions such as speed, engine rpm, temperature, oil pressure along with many other operational parameters. A pointer rotates about an axis and points to a scale to communicate the vehicle condition to a vehicle operator. The pointer is sometimes illuminated to provide visibility and a desired look to the instrument panel.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

DRAWINGS

DESCRIPTION

Figure 1:
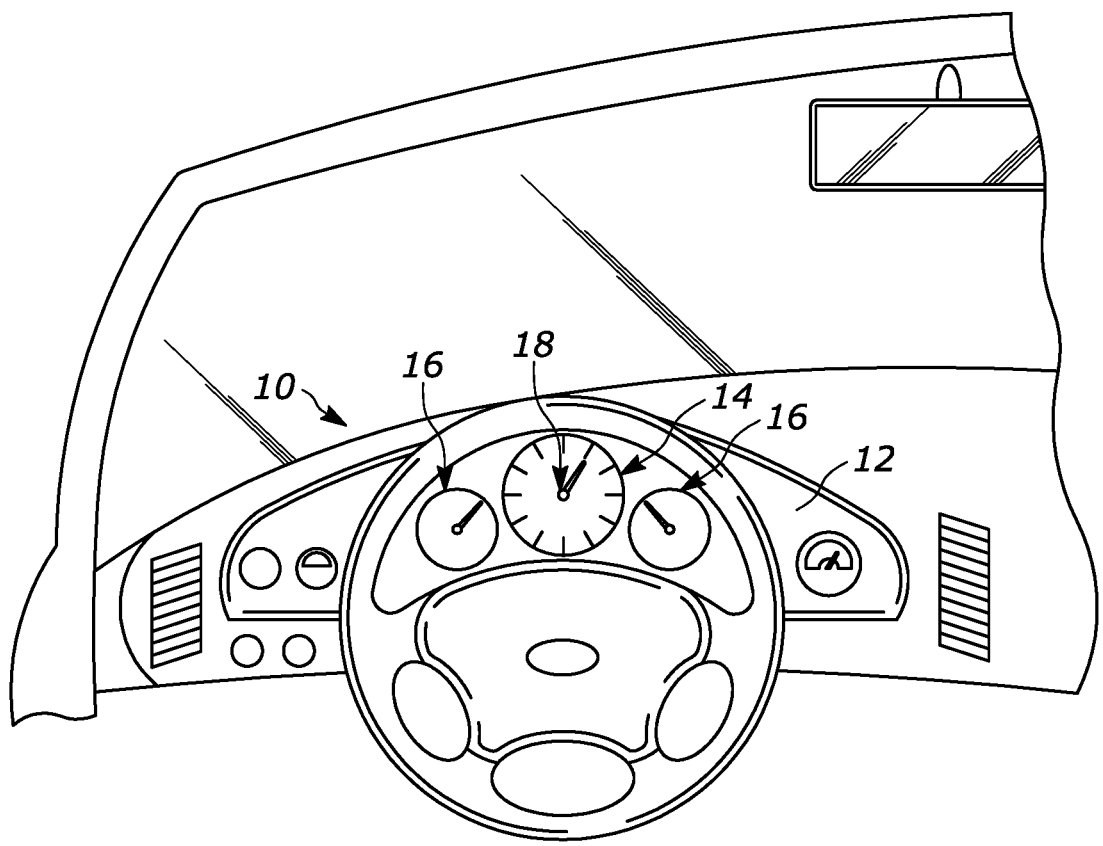
FIG. 1 is a schematic view of an example vehicle dashboard and instrument panel.

Referring to FIG. 1, a vehicle dashboard 10 is shown and includes an instrument panel 12 that includes a main gauge 14 and accessory gauges 16. The gauges 14 and 16 include a pointer assembly 18 for indicating a vehicle operating parameter.

Figure 2:
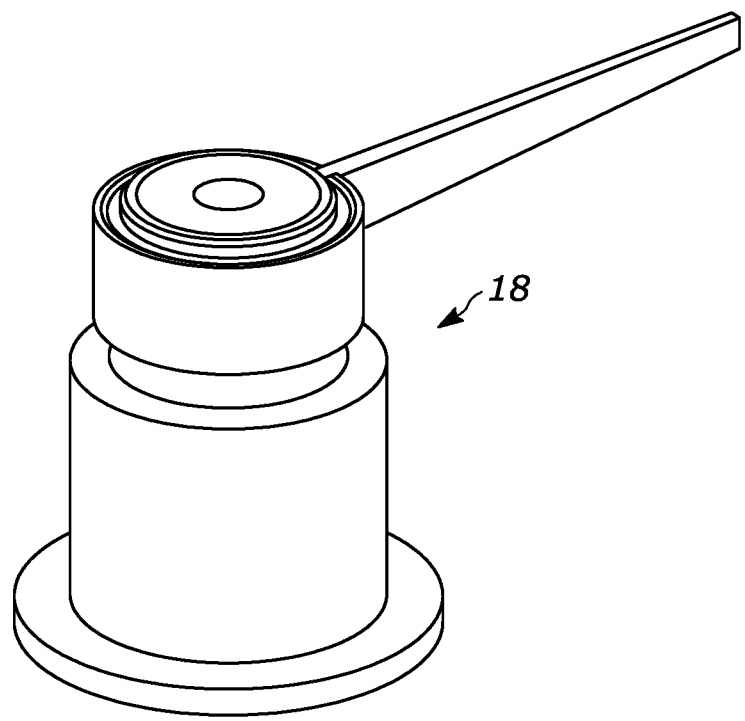
FIG. 2 is isometric view of an example disclosed pointer assembly.
Figure 3:
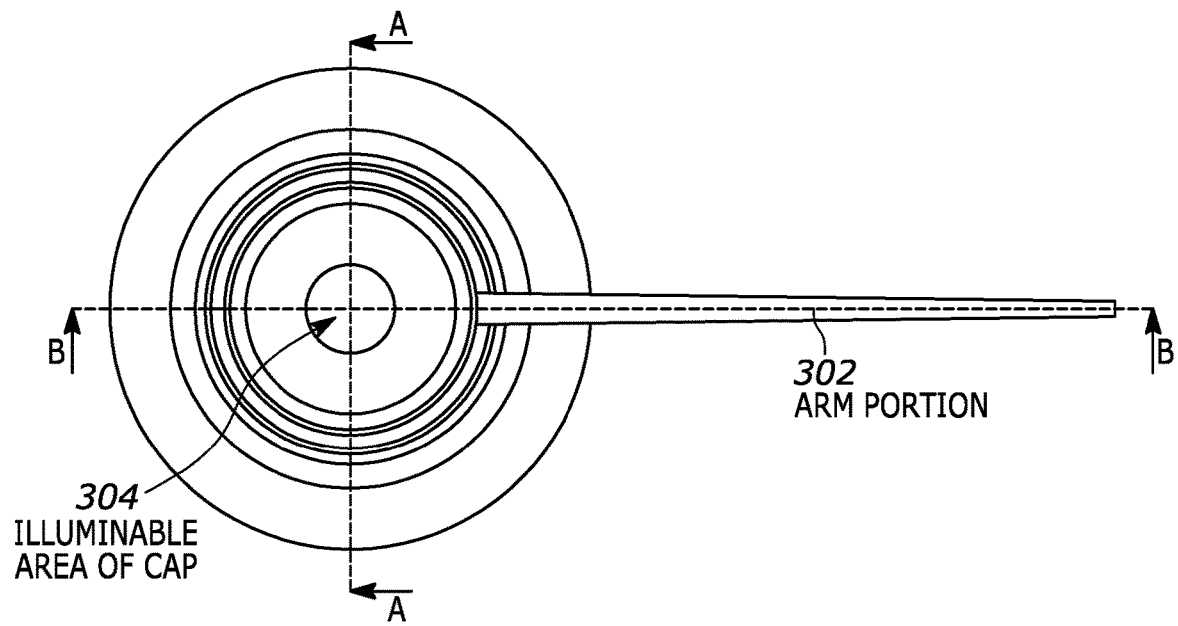
FIG. 3 is a top view of a disclosed pointer assembly.
Figure 4:
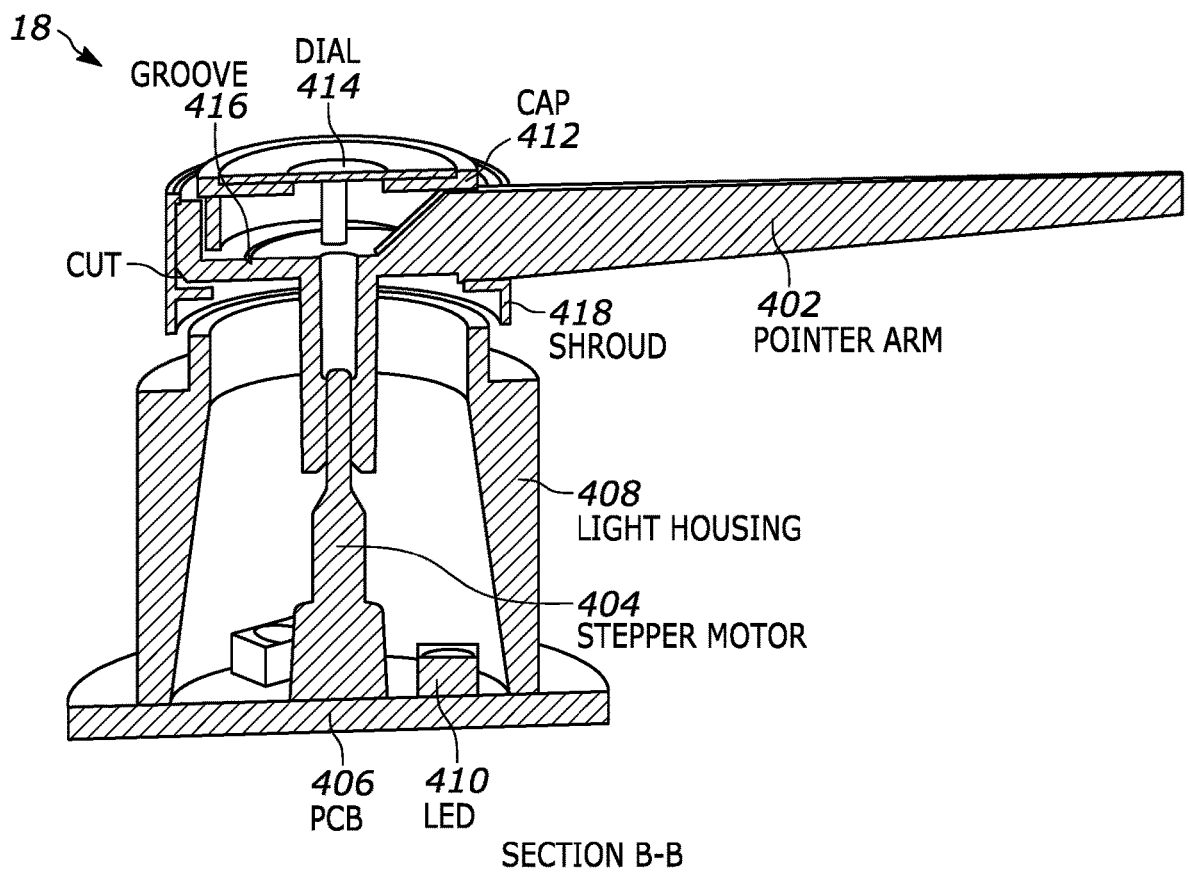
FIG. 4 is a cut-away view of a disclosed pointer assembly.
Figure 5:
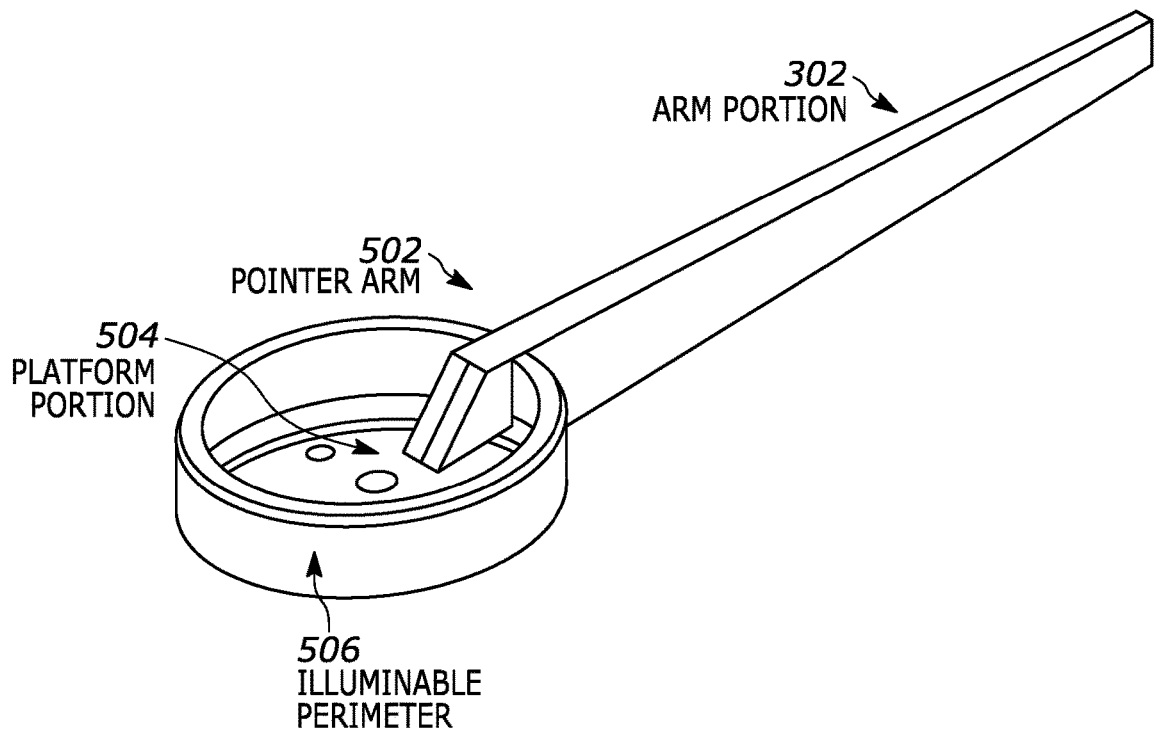
FIG. 5 is a perspective view of an example pointer arm.
Figure 6:
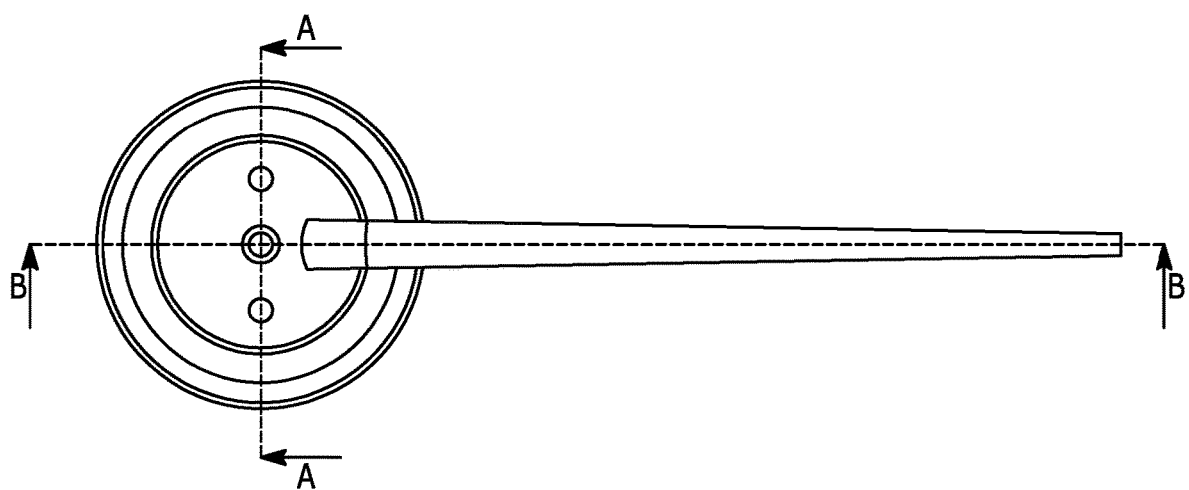
FIG. 6 is a top view of the example pointer arm.
Figure 7:
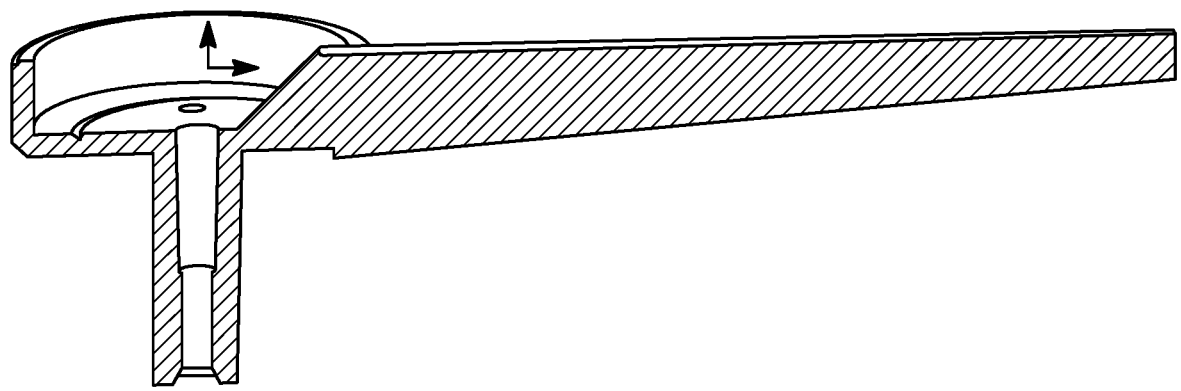
FIG. 7 is a cross-sectional view of the example pointer arm.
Figure 8:
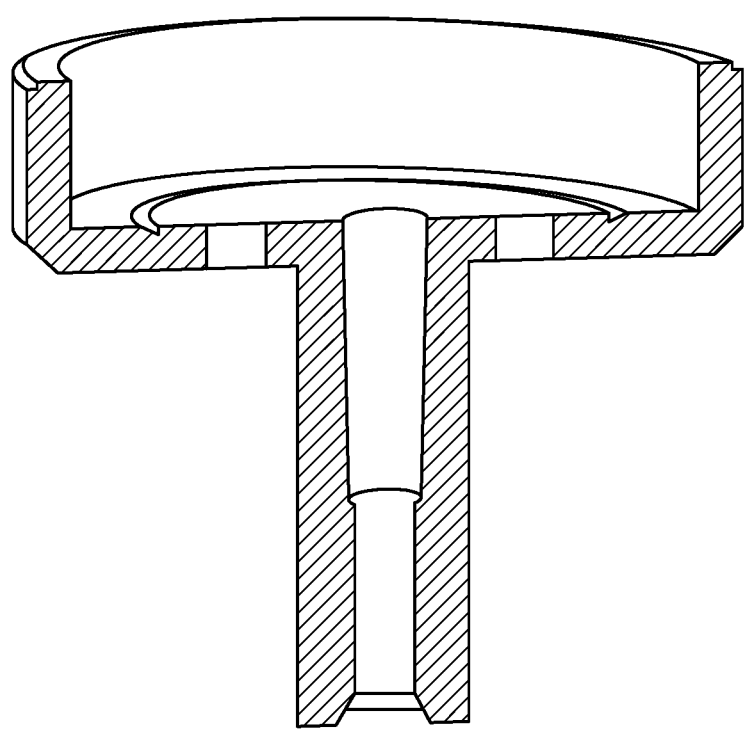
FIG. 8 is another cross-sectional view of the example pointer arm.

Referring to FIG. 2-4, the example disclosed pointer assembly 18 includes a pointer arm 402 supported on a shaft of a stepper motor 404. The stepper motor is supported on a printed circuit board (PCB) 406 within a light housing. Light emitting devices are supported on the printed circuit board and within the light housing 408. In this example, the light emitting devices are light emitting diodes (LED) 410, however other light emitting devices could be used and are within the contemplation of this disclosure.

The pointer arm 402 functions as a light guide and is illuminable by the light emitting devices on the printed circuit board 406. The pointer arm includes a platform portion 504 disposed about an axis of rotation and an arm portion 302 that extends from the platform portion. A column extends downward from the platform portion and includes a central opening for the shaft of the stepper motor. The disclosed example platform portion is circular and includes outer perimeter walls that extend upward from an interior surface. The perimeter walls define a central space about the central opening. Light from the light generating devices 410 in this example is received on a bottom side of the platform portion and is communicated throughout the pointer arm.

A cap 412 is mounted to the platform portion and over the central space. The cap includes an outer perimeter that is disposed inside of the perimeter walls of the platform. A top surface of the cap includes an illuminable portion. In this example the illuminable portion is a separate portion or dial 414 that is attached to a top surface of the cap. The dial is illuminated by light communicated through the pointer arm 402. In this example the illuminable portion is disposed along the axis of rotation. The cap includes an opening through the top surface to enable illumination of the dial. The example dial is circular, however it is within the contemplation of this disclosure that the illuminable portion of the dial could be any shape or graphic design providing a desired appearance.

A shroud 418 is mounted to an outer surface of the perimeter walls of the platform portion of the pointer arm. A top surface of the perimeter wall is visible between the cap and the shroud. The shroud surrounds the outer surface of the perimeter wall of the pointer arm to control or block light visible through the outer surface of the perimeter walls.

Referring to FIGS. 5-8 with continued reference to FIG. 4, the pointer arm is fabricated from a material that provides for communication of light to all surfaces. Accordingly, the arm portion and the perimeter wall portion are illuminated by light communicated to a bottom surface of the pointer arm. The arm portion extends from the platform portion and receives light from the light emitting devices on the circuit board. The platform portion includes a groove 416 on the interior surface that directs light from the bottom surface into perimeter walls and the arm portion. The interior surface further includes mounting holes that receive pins of the cap.

Figure 9:
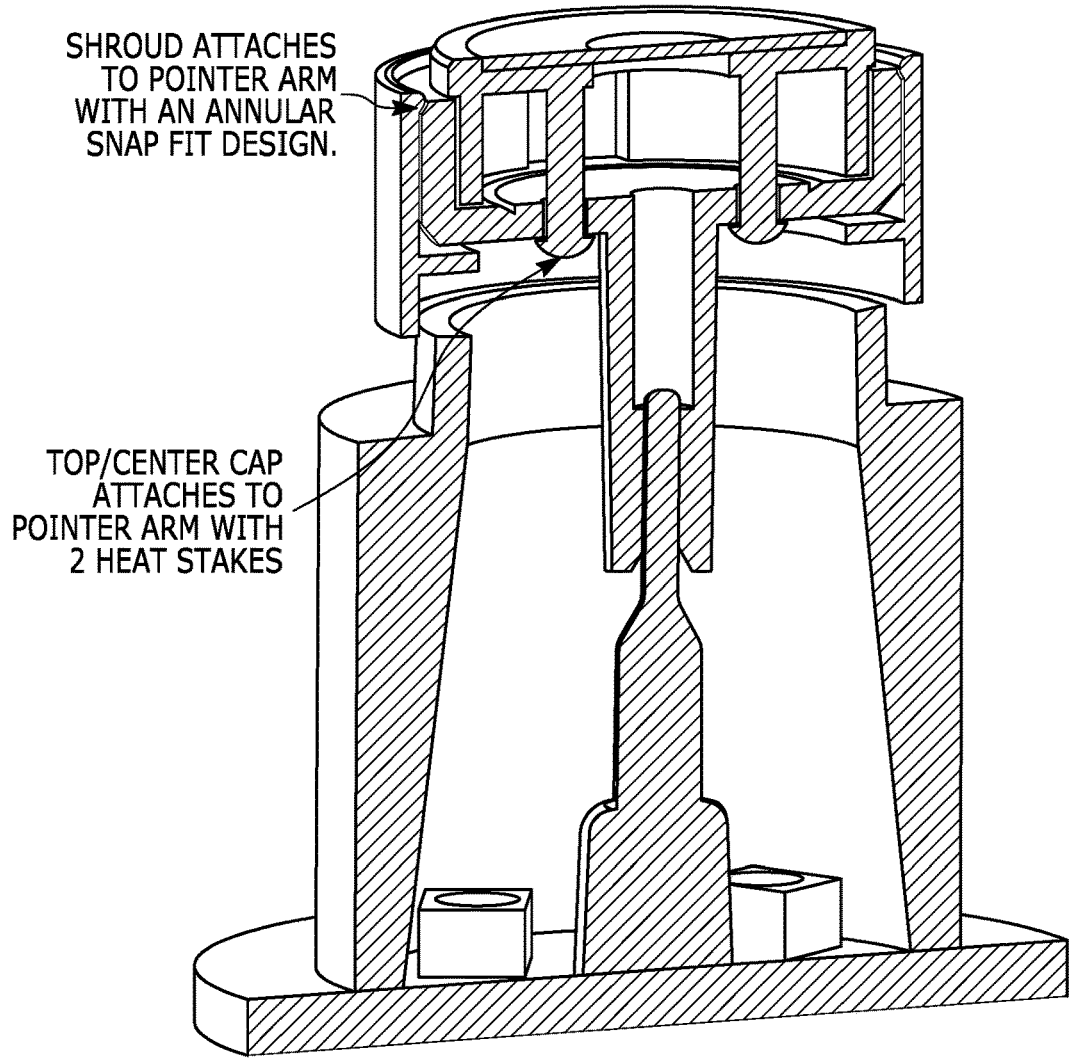
FIG. 9 is another cut-away view of the disclosed pointer assembly.
Figure 10:
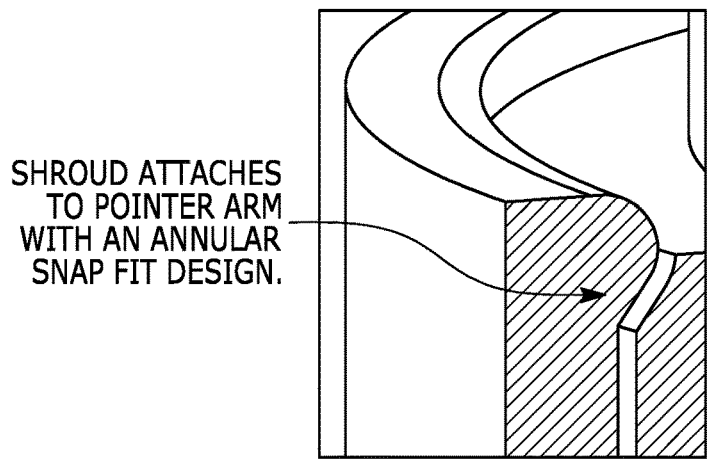
FIG. 10 is an enlarged view of a portion of the pointer assembly.
Figure 11:
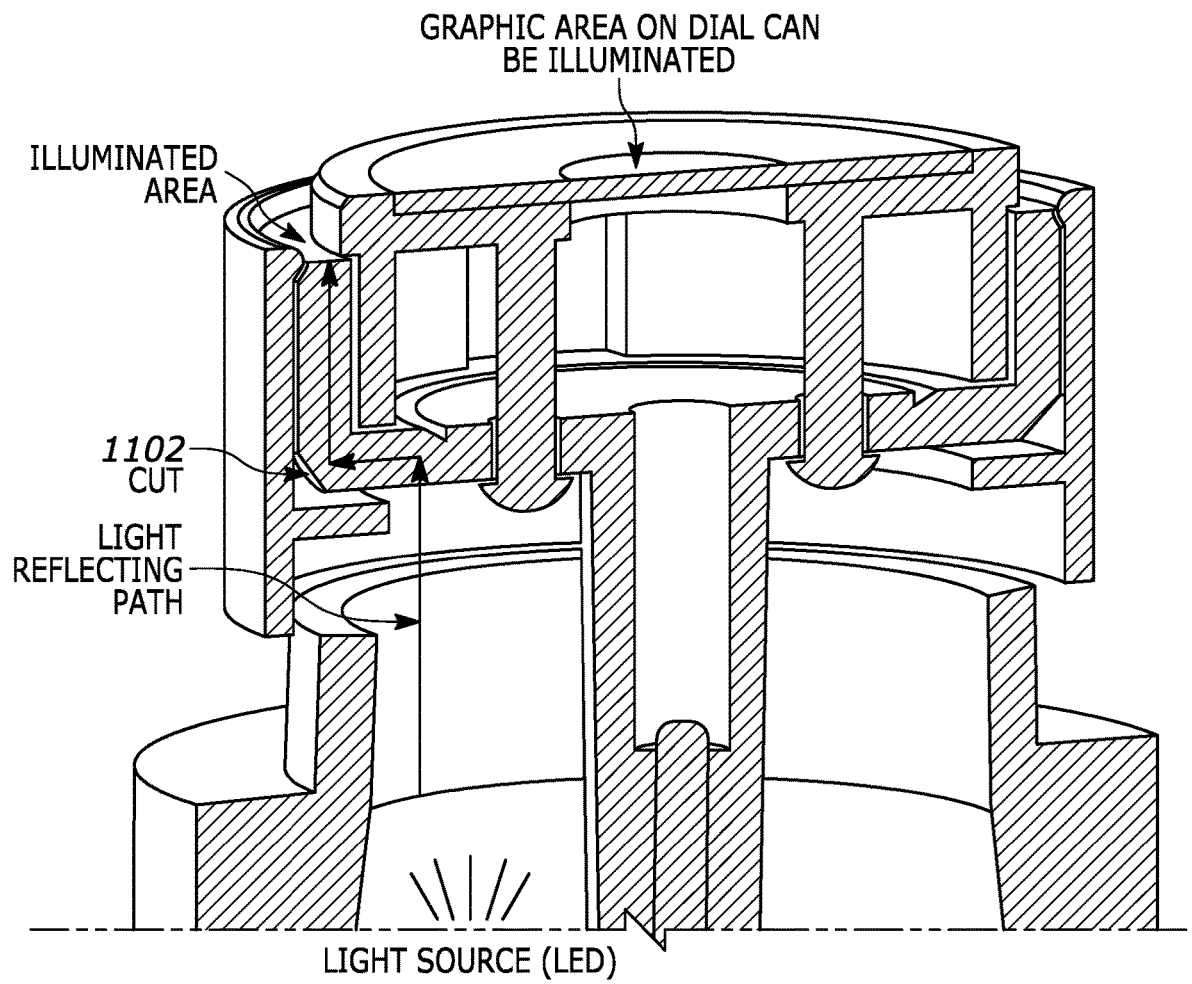
FIG. 11 is an enlarged view of another portion of the pointer assembly.

Referring to FIGS. 9, 10 and 11 with continued reference to the previous figures, the cap includes pins that extend through the mounting holes on the interior surface. Ends of the pins are heat staked to secure the cap to the pointer arm. The shroud includes an annular snap that fits into a corresponding chamfer defined on the perimeter wall. The shroud further includes a bottom lip portion that extends partially under the platform portion to prevent leakage into an area visible to a vehicle operator.

The groove 416 on the interior surface includes a depth and shape for reflecting light through the pointer arm. In this example the groove reflects light through the interior surface of the platform portion into the perimeter wall. The intersection between the upward extending perimeter wall and the interior surface includes a cut 1102 that provides an angled reflecting surface that reflects light upward into the perimeter walls. Accordingly, the groove provides a first reflecting surface the directs light transverse to the axis of rotation and the cut provides a second reflecting surface that directs light within the interior surface upward in a direction substantially parallel to the axis of rotation. As is shown the perimeter walls are disposed substantially parallel to the axis rotation and the top surface is substantially transverse to the axis rotation.

Light reflects within the perimeter wall and to the top surface. Because the top surface is not covered by either the cap or the shroud, it is visible to the vehicle operator. In this example the perimeter wall is circular and therefore the visible top surface of the perimeter walls defines a circle about the axis of rotation. (Best show in FIG. 3). Light is further reflected into the arm portion to illuminate the arm portion. Light is therefore propagated through the pointer platform to the viewable surfaces. The depth and shape of the groove are defined to tailor light reflection into the arm and the perimeter walls. Similarly, the length and angle of the cut provides regulation of light transmitted into the perimeter walls. Regulation of the depth angle and shape of the groove enable tailoring of luminance in the top surface that provides the visible ring in the pointer assembly. Moreover, the surface roughness of the groove, cut and the top surface of the perimeter wall may also be modified to tailor luminance. Additional cuts and grooves could be provided to further tailor the propagation of light through the pointer arm.

Although an example embodiment has been disclosed, a worker of ordinary skill in this art would recognize that certain modifications would come within the scope of this disclosure. For that reason, the following claims should be studied to determine the scope and content of this disclosure.

Embodiments of the invention include:

1. A pointer assembly (18) for a vehicle instrument panel (12) comprising:
a pointer arm (402) including a platform portion (504) disposed about an axis of rotation and an arm portion (302) extending outward from the platform portion, the platform portion including an illuminable perimeter (506);
a cap (412) secured to the platform portion of the pointer arm inside of the illuminable perimeter; and
a shroud (418) secured to the platform portion of the pointer arm outside of the illuminable perimeter, wherein the illuminable perimeter is visible between an outer perimeter of the cap (412) and an inner perimeter of the shroud (418).

2. The pointer assembly as recited in claim 1, wherein the pointer arm includes a column extending from the platform portion about the axis, the column including a central opening.

3. The pointer assembly as recited in claim 1, wherein the cap includes an illuminable area (414).

4. The pointer assembly as recited in claim 1, including a light housing (408) supported on a circuit board (406), the circuit board including light generating devices (410) disposed within the light housing for directing light into the pointer arm.

5. The pointer assembly as recited in claim 4, including a stepper motor (404) having rotatable shaft for moving the pointer assembly about the axis.

6. An instrument panel assembly (12) comprising:
at least one gauge (14, 16) defining a scale representing a vehicle operating parameter; and
a pointer assembly (18) for indicating on the scale to communicate a value of a vehicle operating parameter, the pointer assembly including:
a pointer arm (502) including a platform portion (504) and an arm portion (302) extending outward from the platform portion, the platform portion including an illuminable perimeter;
a cap (412) secured to the platform portion of the pointer arm inside of the illuminable perimeter (506); and
a shroud (418) secured to the platform portion of the pointer arm outside of the illuminable perimeter, wherein the illuminable perimeter is visible between an outer perimeter of the cap and an inner perimeter of the shroud.

The invention claimed is:

1. A pointer assembly for a vehicle instrument panel comprising:
a pointer arm including a platform portion disposed about an axis of rotation and an arm portion extending outward from the platform portion, the platform portion including an illuminable perimeter;
a cap secured to the platform portion of the pointer arm inside of the illuminable perimeter; and
a shroud secured to the platform portion of the pointer arm outside of the illuminable perimeter, wherein the illuminable perimeter is visible between an outer perimeter of the cap and an inner perimeter of the shroud.

2. The pointer assembly as recited in claim 1, wherein the pointer arm includes a column extending from the platform portion about the axis, the column including a central opening.

3. The pointer assembly as recited in claim 1, wherein the cap includes an illuminable area.

4. The pointer assembly as recited in claim 1, including a light housing supported on a circuit board, the circuit board including light generating devices disposed within the light housing for directing light into the pointer arm.

5. The pointer assembly as recited in claim 4, including a stepper motor having a rotatable shaft for moving the pointer assembly about the axis.

6. An instrument panel assembly comprising:
at least one gauge defining a scale representing a vehicle operating parameter; and
a pointer assembly for indicating on the scale to communicate a value of a vehicle operating parameter, the pointer assembly including:
a pointer arm including a platform portion and an arm portion extending outward from the platform portion, the platform portion including an illuminable perimeter;
a cap secured to the platform portion of the pointer arm inside of the illuminable perimeter; and
a shroud secured to the platform portion of the pointer arm outside of the illuminable perimeter, wherein the illuminable perimeter is visible between an outer perimeter of the cap and an inner perimeter of the shroud.

* * * * *